(12) United States Patent
Göbel et al.

(10) Patent No.: US 6,602,820 B1
(45) Date of Patent: Aug. 5, 2003

(54) METHOD FOR PRODUCING A NITROGEN OXIDE STORAGE MATERIAL AND A STORAGE MATERIAL MADE WITH IT

(75) Inventors: Ulrich Göbel, Hattersheim (DE); Lutz Marc Ruwisch, Darmstadt (DE); Ralph Kiessling, Limeshain (DE); Martin Foerster, Büdingen (DE)

(73) Assignee: Degussa-Huls Aktiengesellschaft, Frankfurt am Main (DE)

( * ) Notice: Subject to any disclaimer, the term of this patent is extended or adjusted under 35 U.S.C. 154(b) by 82 days.

(21) Appl. No.: 09/712,186

(22) Filed: Nov. 15, 2000

(30) Foreign Application Priority Data

Nov. 17, 1999 (DE) .......................................... 199 55 456

(51) Int. Cl.[7] .......................... B01J 21/00; B01J 20/10; B01J 23/02; B01J 23/10; B01J 23/40

(52) U.S. Cl. .................... 502/304; 502/303; 502/326; 502/327; 502/328; 502/340; 502/341; 423/213.2; 423/213.5

(58) Field of Search ................................ 502/303, 304, 502/340, 341, 349, 355, 326, 327, 328; 423/213.2, 213.5

(56) References Cited

U.S. PATENT DOCUMENTS

| 4,624,941 A | * 11/1986 | Berndt et al. ............. 423/213.5 |
| 4,910,180 A | * 3/1990 | Berndt et al. ............. 423/213.5 |
| 5,024,985 A | * 6/1991 | Koberstein et al. ......... 502/304 |
| 5,256,389 A | * 10/1993 | Jordan et al. ................. 423/127 |
| 5,762,894 A | * 6/1998 | Takatori et al. ............. 423/263 |
| 5,919,727 A | * 7/1999 | Brezny ........................ 502/302 |
| 6,025,296 A | * 2/2000 | Takemoto et al. .......... 502/232 |
| 6,051,529 A | * 4/2000 | Brezny ..................... 423/239.1 |
| 6,348,430 B1 | * 2/2002 | Lindner et al. ............. 502/304 |
| 6,350,421 B1 | * 2/2002 | Strehlau et al. .......... 423/213.2 |
| 6,413,904 B1 | * 7/2002 | Strehlau et al. ............. 502/328 |
| 2001/0043896 A1 | * 11/2001 | Domesle et al. ......... 423/213.5 |

FOREIGN PATENT DOCUMENTS

WO    WO 9816472 A1 *  4/1998    ........... C01G/25/00

* cited by examiner

Primary Examiner—Steven Bos
Assistant Examiner—Anthony Kuhar
(74) Attorney, Agent, or Firm—Kalow & Springut LLP

(57) ABSTRACT

A method for producing a nitrogen oxide storage material that contains at least one storage component in the form of particles of an oxide, carbonate or hydroxide of the elements magnesium, strontium, barium, lanthanum and cerium on a carrier material from the group consisting of doped cerium oxide, cerium/zirconium mixed oxide and aluminum oxide or mixtures of these. The method is carried out by suspending the support material in an aqueous solution of precursors of the storage components, this suspension is then introduced into a hot gas stream, the temperature of which is calculated so that, during a residence time of the suspension in the hot gas stream of less than one minute, the solvent of the suspension is evaporated out and the precursors of the storage components are thermally broken down and converted to the storage components before the storage material that forms in this way is separated from the stream of hot gases.

8 Claims, 2 Drawing Sheets

METHOD FOR PRODUCING A NITROGEN OXIDE STORAGE MATERIAL AND A STORAGE MATERIAL MADE WITH IT

INTRODUCTION AND BACKGROUND

The present invention relates to a method for producing a nitrogen oxide storage material that contains at least one storage component in the form of particles of an oxide, carbonate or hydroxide of an element selected from the group consisting of magnesium, strontium, barium, lanthanum and cerium on a support material selected from the group consisting of doped cerium oxide, cerium/zirconium mixed oxide and aluminum oxide or mixtures of these.

In the area of gasoline engines the so-called lean-burning engines, which are operated with lean air/fuel mixtures when operating under a partial load, were developed to reduce fuel consumption. A lean air/fuel mixture contains a higher oxygen content than is necessary for complete combustion of the fuel. The exhaust gas then contains the oxidizing components oxygen ($O_2$), and nitrogen oxides ($NO_x$) in an excess amount compared to the reducing components carbon monoxide (CO), hydrogen ($H_2$) and hydrocarbons (HC). A lean exhaust gas usually contains 3–15 vol % oxygen. However, at load or full load operation, even in the case of lean-running gasoline engines are operated with stoichiometric or even substoichiometric, i.e., rich, air/fuel mixtures, too.

Because of the high oxygen content of the exhaust gas of lean burning motors or diesel motors the nitrogen oxides contained in them may not be reduced to nitrogen by means of the so-called three-way catalysts with simultaneous oxidation of hydrocarbons and carbon monoxide, as is the case with stoichiometrically operated gasoline engines.

For this reason nitrogen oxide storage catalysts that store the nitrogen oxides in lean exhaust gas in the form of nitrates were developed to remove the nitrogen oxides from these exhaust gases.

The operation of nitrogen oxide storage catalysts is described in detail in the SAE publication SAE 950809 which is relied on and incorporated herein by reference. Accordingly, nitrogen oxide storage catalysts consist of a catalyst material that is applied for the most part in the form of a coating onto an inert ceramic or metal honeycomb, a so-called carrier element. The catalyst material contains the nitrogen oxide storage material and a catalytically active component. The nitrogen oxide storage material again consists of the actual nitrogen oxide storage component that is deposited on a support material.

Chiefly, the basic oxides of the alkali metals, alkaline earth metals and rare earth metals, in particular barium oxide, which react with nitrogen dioxide to form the corresponding nitrates, are used as storage components. It is known that these materials in air occur for the most part in the form of carbonates and hydroxides. These compounds are also suitable for storage as nitrogen oxides. For this reason, when the term "basic storage oxides" is used within the scope of the invention, the corresponding carbonates and hydroxides are also included in this term.

The substances usually used as the catalytically active components are the noble metals of the platinum group, which as a rule are deposited onto the support material together with the storage component. Mainly active, high surface area aluminum oxide is used as support material.

The task of the catalytically active components is to convert carbon monoxide and hydrocarbons in the lean exhaust gas to carbon dioxide and water. In addition, they are intended to oxidize nitrogen monoxide contained in the exhaust gas to nitrogen dioxide, so that it can react with the basic storage material to form nitrates. The storage capacity of the storage material drops off with increasing deposition of nitrogen oxides in it and for this reason it has to be regenerated from time to time. To do this, the engine is run with stoichiometric or rich air/fuel mixtures for a short time. Under the reducing conditions in the rich exhaust gas the nitrates that are formed are broken down to nitrogen oxides NO, and, using carbon monoxide, hydrogen and hydrocarbons as reducing agents, reduced to nitrogen, forming water and carbon dioxide. The storage catalyst operates as a three way catalyst during this phase of operation.

Various combinations of storage components and support materials are known from the patent literature. For instance, EP 0 562 516 A1 describes a catalyst of barium oxide, lanthanum oxide and platinum on a support material of aluminum oxide, zeolite, zirconium oxide, aluminum silicate or silicon dioxide, where at least one part of the barium oxide and the lanthanum oxide forms a mixed oxide. This mixed oxide is intended to suppress the formation of lanthanum aluminate, which would otherwise lead to aging of the catalyst. To make the catalyst, a honeycomb carrier element is first coated with an aluminum oxide dispersion and then dried and calcined. Then the coating is impregnated sequentially or simultaneously with a lanthanum salt solution and a barium salt solution, dried and calcined at 300° C. for a period of 1 h. Then the coating is impregnated with a platinum salt solution, again dried and calcined.

EP 0 653 238 A1 proposes the use of titanium oxide as support material, which contains at least one element from the group consisting of the alkali metals, alkaline earth metals and the rare earth metals in the form of a solid solution. To produce this storage material, titanium dioxide is impregnated with a solution of the precursor compounds of the storage components and then calcined at temperatures over 600° C. to form the solid solution.

EP 0 666 103 A1 describes a catalyst that contains a nitrogen oxide storage component and a noble metal on a porous support material. Aluminum oxide, zeolite, zirconium oxide, aluminum silicate and silicon dioxide are proposed as support materials. The nitrogen oxide storage component and noble metal are deposited in close association on these support particles. In addition, the catalyst can also contain cerium oxide as an oxygen storage component, with the cerium oxide being kept separate from the noble metal and thus from the nitrogen oxide storage component. To deposit the storage components and the noble metal onto the support material it is impregnated with solutions of precursors of these components and calcined.

WO 97/02886 describes a nitrogen oxide storage catalyst in which metal oxides, metal hydroxides, metal carbonates and metal mixed oxides are used as storage components. The metals can be lithium, sodium, potassium, rubidium, cesium, magnesium, calcium, strontium or barium. The storage components can either be used in powder form or deposited on aluminum oxide by impregnation with precursor compounds of the storage components. The impregnated aluminum oxide powder is calcined for 2 h at 550° C.

DE 197 13 432 A1 describes a catalytic base material for an exhaust gas purification catalyst that is obtained by impregnating cerium oxide powder with a barium-containing solution and calcining the cerium oxide particles at about 400–1100° C. to form and accumulate barium oxides on the surface of the cerium oxide particles. According to this publication, a mixture of barium oxides and cerium oxide particles is heated to a relatively high temperature in order to intentionally form coarse-grained barium oxides on the surface of the cerium oxide particles. Temperatures of 800–1100° C. are effective for this. The cerium oxide particles are preferably calcined at 900° C. for a period of 24 h. Particle sizes of the barium oxide particles between 7 and 14 μm result. At a calcination temperature of 200° C. the barium oxide particles still have an average particle size of 1.9 μm.

The catalytic base material in accordance with DE 197 13 432 A1 serves for making a catalyst that is particularly effective when it is used on an engine with lean combustion. This catalyst is thus a so-called lean $NO_x$ catalyst, which is capable in the presence of sufficient reducing components in the exhaust gas (carbon monoxide and hydrocarbons) of converting nitrogen oxides even in a constantly lean exhaust gas. The catalytic base material increases the temperature stability of the catalyst. DE 197 13 432 A1 does not provide any information regarding a possible nitrogen oxide storage capacity of the catalytic base material.

Thus with the known methods for making nitrogen oxide storage materials the selected support material as a rule is conventionally impregnated with soluble precursors of the storage components, then dried and calcined. As thorough research by the inventor showed, chromatographic effects occur during drying and calcining and these lead to the storage components aggregating on the surface of the support materials to form larger particles with diameters between several hundreds of nanometers up to micrometers. DE 197 13 432 A1 is an extreme example, in which the barium oxide particles have diameters of several micrometers and thus have sizes of the same order of magnitude as the support material that is used.

Another effect of the known production processes is the agglomeration and sintering of the powder particles of the storage material as a consequence of the intimate contact between the powder particles and of the high temperatures in the calcination ovens. For this reason the calcined material cannot be directly deposited onto the intended carrier element, but rather it has to be thoroughly ground in a slow and energy-intensive process before the coating operation.

Research by the inventors show that the dynamic storage behavior of the storage material prepared in this way is adversely affected by the relatively large particles of the storage components. Interaction with the exhaust gas is hindered by the low surface area of the coarse particles and the nitrogen oxides have to travel lengthy diffusion paths in the particles. This is also true for the regeneration of the storage components, so that this operation becomes slower with increasing storage component particle sizes. When used in a motor vehicle, this has the result that the rate of storage of nitrogen oxides drops off relatively rapidly and the regeneration of the storage materials has to be begun long before the theoretical storage capacity, which is a function of the total weight of the storage components, has been reached.

Also, the poisoning of the storage components by the formation of sulfates is subject to the just described dependencies on the particle sizes of the storage components. This does lead to slower poisoning, but the required desulfatization is likewise made distinctly more difficult through these relationships.

For this reason an object of this invention is to provide a method for making a nitrogen oxide storage material that is characterized by a high useful storage efficiency, good dynamics in the storage and regeneration cycles and by easy desulfatization.

SUMMARY OF THE INVENTION

The above and other objects of the invention can be achieved by a method for making a nitrogen oxide storage material that contains at least one storage component in the form of particles of an oxide, carbonate or hydroxide of the elements magnesium, strontium, barium, lanthanum and cerium on a support material selected from the group consisting of doped cerium oxide, cerium/zirconium mixed oxide and aluminum oxide or mixtures of these. The method is characterized by the fact that the support material is suspended in an aqueous solution of precursors of the storage components, this suspension is then introduced into a hot gas stream, the temperature of which is calculated so that, during a residence time of the suspension in the hot gas stream of less than one minute, the solvent of the suspension is evaporated and the precursors of the storage components are thermally broken down and converted into the storage components, before the storage material formed in this way becomes separated from the stream of hot gases.

Thus, in contrast to the known methods the storage material is not produced by slow drying and subsequent calcination, where these processes in some cases take several hours, but rather the suspension of the support material in the solution of precursors of the storage components is sprayed into a hot gas stream. The drying and calcination of the storage material that forms takes place, in this case in a period of less than one minute.

The hot gas stream is preferably generated by a burner and then sent through a reaction tube. The combination of burner and reaction tube is also called the reactor in what follows.

BRIEF DESCRIPTION OF THE DRAWINGS

The present invention will be further understood with reference to the accompanying drawings, wherein.

DETAILED DESCRIPTION OF THE INVENTION

Figure 1:
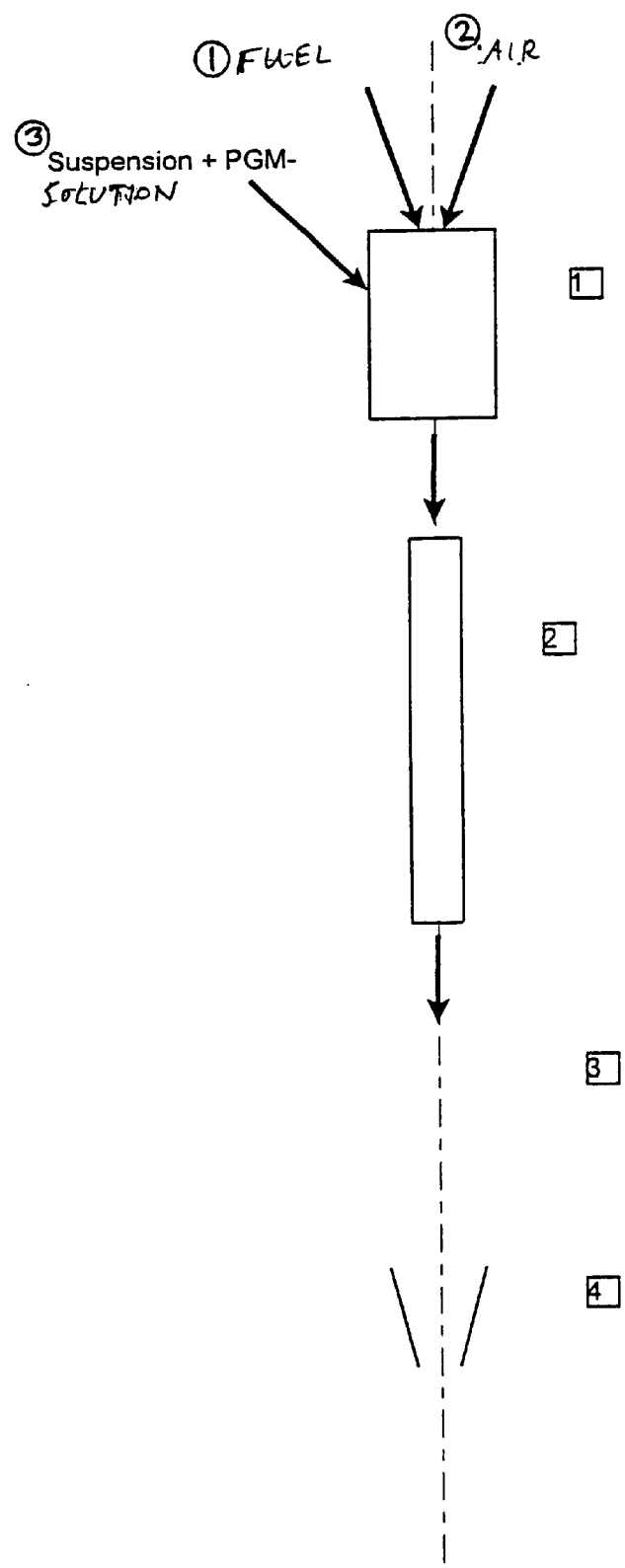
FIG. 1 and FIG. 2 are schematic representations of the reactor of the invention.

The suspension sprayed into the combustion gases is carried by these gases. During the residence time in the hot gas stream the solvent of the suspension is evaporated. The precursors of the storage components are thermally decomposed and converted to the storage compounds per se. The storage material formed and calcined in this way is separated from the hot gas stream after leaving the reaction tube by a filter or other separator.

The residence time of the suspension in hot combustion gases can be adjusted through the choice of the mass flow rate. Residence times of less than one minute are the aim. Preferably, residence times of less than 10 sec are established. In practice residence times of under one second were even realized. The combustion temperature must in this case be chosen so that in spite of the short residence times the desired thermal decomposition of the precursor compounds of the storage components can take place. Temperatures between 300 and 1500° C. proved to be favorable for this. Temperatures between 700 and 1100° C. which can be generated, for example, by a burner operating on natural gas and air, are preferred. The burner is operated with a super-stoichiometric air/fuel mixture, with normalized air/fuel ratio, lambda, greater than 1, in order to favor the formation of the oxide storage compounds.

Chromatographic effects cannot develop fully during the short residence times in the hot gas stream, so that agglomeration of the storage components on the surface of the support material to form larger particles does not happen. Thus, in each case according to the desired concentration of the support material, a finely divided deposition of the storage components is observed or, at higher concentrations, a closed coating is observed on the surface of the support material.

The production method thus leads to the storage components having a high surface area and to good accessibility to the storage components and ability of their storage capacity to be used by the exhaust gas. The theoretical storage capacity of the storage material results from the molar amount of storage components with which the support material is loaded. The greater the surface area for interaction between the storage components and the exhaust gas is, the better this maximum storage capacity can be utilized.

In the described calcination the particles of the storage material are carried by the hot exhaust gases of the burner. This process can be called fluid calcination. In fluid calcination the particles of the storage material only have little contact with each other. For this reason agglomeration and sintering of the particles together cannot happen. Beyond the described effects, this absolutely guarantees good accessibility of the storage components for the exhaust gas that is to be purified. In addition, the cost for grinding the storage material before coating the intended carrier element can be reduced compared to the prior art.

Spraying the suspension can take place at various sites in the reactor. Preferably, the suspension is sprayed directly into the flame of the burner. However, there is also the possibility of spraying the suspension into the hot gas stream at some position along the reaction tube. In both cases there is the possibility of adding solutions of precursors of the platinum group metals from the group consisting of platinum, palladium, rhodium and iridium to the suspension of the support material in order to dope the storage material that forms with these metals.

However, the injection of solutions of precursors of the said platinum group metals preferably takes place separately and not until after the injection of the suspension. Because of this, the platinum group metals do not become buried by the storage components, but rather are deposited on the surface of the already formed particles of the storage components. This operation can be influenced through the choice of the distance between the injection of the suspension and the injection of the solution of platinum group metals. Preferably, the suspension is injected directly into the flame of the burner and the solution with the precursors of platinum group metals is subsequently added to the heterogeneous reaction mixture at a point along the reaction tube. Here the reaction mixture is cooled by the heat of evaporation of the solvent. To compensate the cooling, the reaction tube can be appropriately heated.

The described method of production thus allows a catalyzed storage material to be produced in a single process operation.

Active aluminum oxides, cerium oxide stabilized by doping and cerium/zirconium mixed oxides are suitable as support materials for the storage components. These support materials preferably have specific surfaces in fresh state of above 10–400 m$^2$/g.

For stabilization against temperature stresses, cerium oxide is stabilized with oxides of elements from the group consisting of silicon, scandium, yttrium and the rare earth metals (lanthanum, praseodymium, neodymium, promethium, samarium, europium, gadolinium, terbium, dysprosium, holmium, erbium, thulium, ytterbium and luthetium) or mixtures of their oxides. 0.5–20, preferably 5–10 wt %, of the relevant oxide or oxide mixture is necessary for this. The concentration data in this case refer to the total weight of the support material. The doping can take place by substantially known methods such as, for example, coprecipitation, cothermohydrolysis, impregnation and precipitation.

Cerium/zirconium mixed oxides are commercially available with a broad mixture ratio of cerium oxide to zirconium oxide and, like pure cerium oxide, are widely used as oxygen storage materials in conventional three-way catalysts. The production of the cerium/zirconium mixed oxides can take place, for example, by mechanical mixing or impregnation or coprecipitation techniques. Within the scope of this invention the excellent properties of these materials as support materials for the storage components are important. Their oxygen storage capacity is of lesser importance.

The cerium/zirconium mixed oxides have particularly favorable properties as support materials for storage components when the amount of zirconium oxide in the mixed oxide does not exceed 25, preferably 20 wt % with respect to the total weight of the mixed oxide. However, in order to give the cerium oxide sufficient stability with respect to reducing exhaust gas conditions, the content of zirconium oxide in the mixed oxide should not be less than 1 wt %. Zirconium oxide contents between 5 and 15 wt % are particularly advantageous. Very good results were achieved with a content of 10 wt % zirconium oxide.

Also, the cerium/zirconium mixed oxides can additionally be stabilized by doping with the compounds mentioned in connection with cerium oxide.

Precursor compounds for the storage components that are suitable are all compounds of the components that are soluble in water and that can be converted to the corresponding oxides under the described reaction conditions. Nitrates and acetates are particularly suitable.

The solution of precursors of platinum group metals can include aqueous or nonaqueous (organic) solutions. A large number of precursors can be used, provided that they are soluble in the selected solvent and break down under the reaction conditions in the reactor. Examples for platinum include hexachloroplatinic acid, ammonium chloroplatinate, platinum tetrachloride hydrate, platinum nitrate, platinum tetraamine nitrate and others. Preferred precursors are platinum nitrate and methylethanolamine platinum (IV) hexahydroxide $((MEA)_2Pt(OH)_6=((OH-C_2H_4-NH_2-CH_3)_2^+ Pt^{IV}(OH)_6)$ and ethanolamine platinum (IV) hexahydroxide $((EA)_2Pt(OH)_6=(OH-C_2H_4-NH_3)_2^+Pt^{IV}(OH)_6)$ or other organic derivatives of quaternary ammonium salts.

Precursors of rhodium are hexaamine rhodium chloride, rhodium chloride, rhodium nitrate, rhodium acetate and others. For palladium, palladium nitrate is preferably used.

Figure 2:
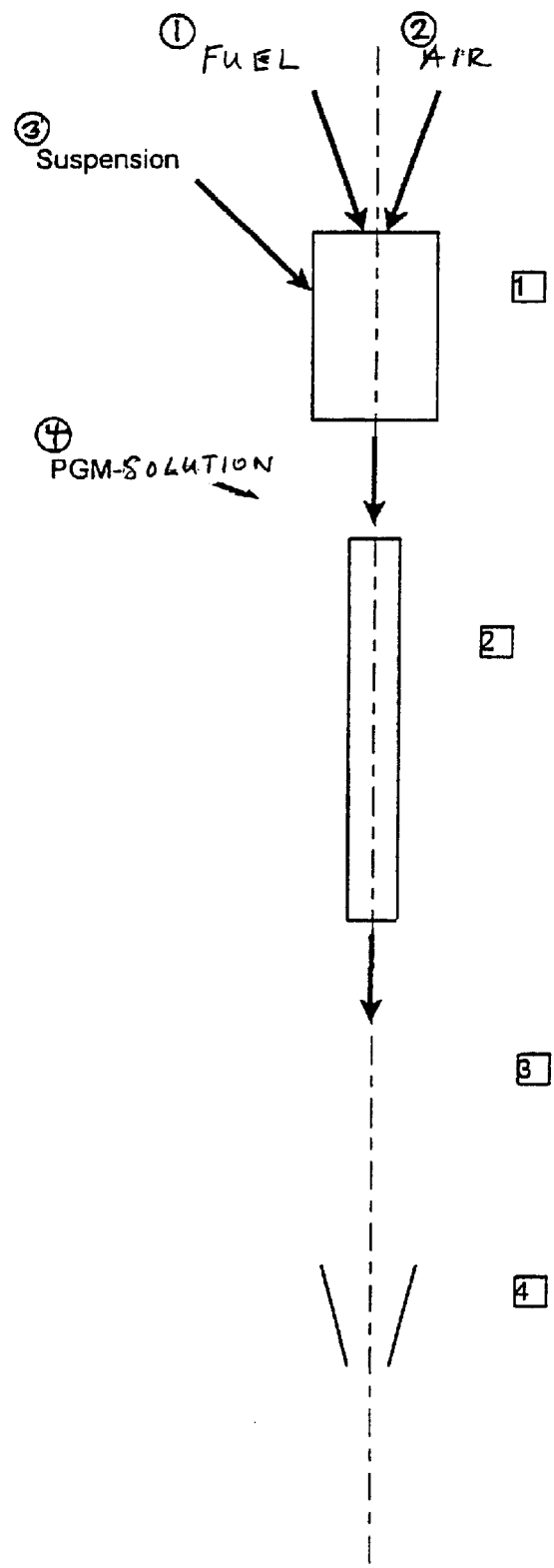

FIGS. 1 and 2 show a reactor for conducting the method in accordance with the invention. Reference number (1) indicates the combustion chamber in which a fuel, as a rule natural gas, is burned while supplying air. The hot combustion gases are then sent through a reaction tube (2). After leaving the reaction tube the storage material that is formed is separated from the hot gas stream in a filter or separator (3). Reference number (4) indicates a blower.

The burner can have a known construction with pulsed combustion. A burner of this kind is described in the Patent DD 114 454. A burner with high turbulence in order to improve mixing of substances is preferably used.

As FIG. 1 shows, a mixture of the suspension of support material and the solution of precursors of the platinum group metals (PGM solution) can be injected directly into the combustion chamber of the reactor. If coating the platinum group metals by the storage components or burying them by the storage components is to be avoided, separate feed of the platinum group metals can be provided as shown in FIG. 2. In accordance with FIG. 2, the suspension of the support material is supplied to the combustion chamber. On the other hand, the solution of the platinum group metals is injected into the reaction tube. According to the position of injection along the length of the reaction tube one can achieve that the platinum group metals are deposited onto already formed storage components.

To prepare the suspension of support material, first solution of the precursors of the storage components is prepared. Then the support material is suspended in this solution. The prepared suspension can have a solids content of 60 wt % and more, with respect to the total weight of the suspension. Solids contents of 50 wt % are preferably used. This suspension is injected into the hot gas with conventional one-component or two-component sprayers.

Further variations and modifications will be apparent to those skilled in the art from the foregoing and we intended to be encompassed by the claims appended hereto.

German priority application 199 55 456.0 filed Nov. 17, 1999 is relied on and incorporated herein by reference.

What is claimed is:

1. A method for producing a nitrogen oxide storage material, which contains at least one storage component in the form of particles of an oxide, carbonate or hydroxide of an element selected from the group consisting of magnesium, strontium, barium, lanthanum and cerium on a support material selected from the group consisting of doped cerium oxide, cerium/zirconium mixed oxide, aluminum oxide and mixtures of these, comprising suspending the support material in an aqueous solution of a precursor of the storage component and a solvent to form a suspension, introducing the suspension into a hot gas stream, the temperature of the hot gas stream is adjusted to between 700 and 1100° C. so that during a residence time of the suspension in the hot gas stream of less than one minute the solvent evaporates, thermally breaking down the precursor of the storage component and converting to the storage component before separating the storage material from the stream of hot gas.

2. The method according to claim 1, wherein the hot gas stream is generated by a burner and sent through a reaction tube.

3. The method according to claim 2, wherein the burner is operated superstoichiometrically with a normalized air/fuel ratio greater than 1.

4. The method according to claim 3, wherein the suspension is injected into a flame of the burner.

5. The method according to claim 3, further comprising injecting the suspension into the hot gas stream at a position along the length of the reaction tube.

6. The method according to claim 1, further comprising adding the suspension of the carrier material to a solution of a precursor of a platinum group metal selected from the group consisting of platinum, palladium, rhodium and mixtures thereof in order to dope the storage material that forms with said metal.

7. The method according to claim 4, further comprising injecting a solution of a precursor of a platinum group metal selected from the group consisting of platinum, palladium, rhodium, iridium and mixtures thereof into the reaction mixture of the hot gas stream and the suspension at a position along the reaction tube for doping of the storage material that forms with said metal.

8. The method according to claim 7, wherein the reaction tube is heated in order to compensate the heat of evaporation of the solution.

* * * * *